United States Patent [19]
Harrison

[11] 3,858,178
[45] Dec. 31, 1974

[54] DIRECTION INDICATOR SYSTEMS FOR TRACTOR-TRAILER VEHICLES

[75] Inventor: David Blackburn Harrison, Radlett, England

[73] Assignee: The Lucas Electrical Company Limited, Birmingham, England

[22] Filed: Sept. 17, 1973

[21] Appl. No.: 397,738

[30] Foreign Application Priority Data
Sept. 16, 1972 Great Britain.................. 43045/72

[52] U.S. Cl. .................. 340/80, 340/81 F, 340/251
[51] Int. Cl. .......................... G08b 5/38, B60q 1/26
[58] Field of Search .......... 340/80, 81 R, 81 F, 251

[56] References Cited
UNITED STATES PATENTS

| | | | |
|---|---|---|---|
| 3,422,421 | 1/1969 | Moller et al. ................ | 340/81 R X |
| 3,665,207 | 5/1972 | Sieber ......................... | 340/81 R X |
| 3,768,085 | 10/1973 | Gebhardt et al. ............. | 340/81 R X |

Primary Examiner—Donald J. Yusko
Attorney, Agent, or Firm—Holman & Stern

[57] ABSTRACT

A direction indicator system for a tractor-trailer vehicle has at least two lamps on each side of the tractor and at least one lamp on each side of the trailer, together with a direction indicator switch to which power is supplied by an oscillator, the direction indicator switch energising either the left-hand or the right-hand lamps. If two of the lamps fail on one side of the vehicle, the frequency of the oscillator is altered, but if one only of the lamps on one side of the vehicle fails, then one of two pilot lamps in the system is extinguished.

5 Claims, 1 Drawing Figure

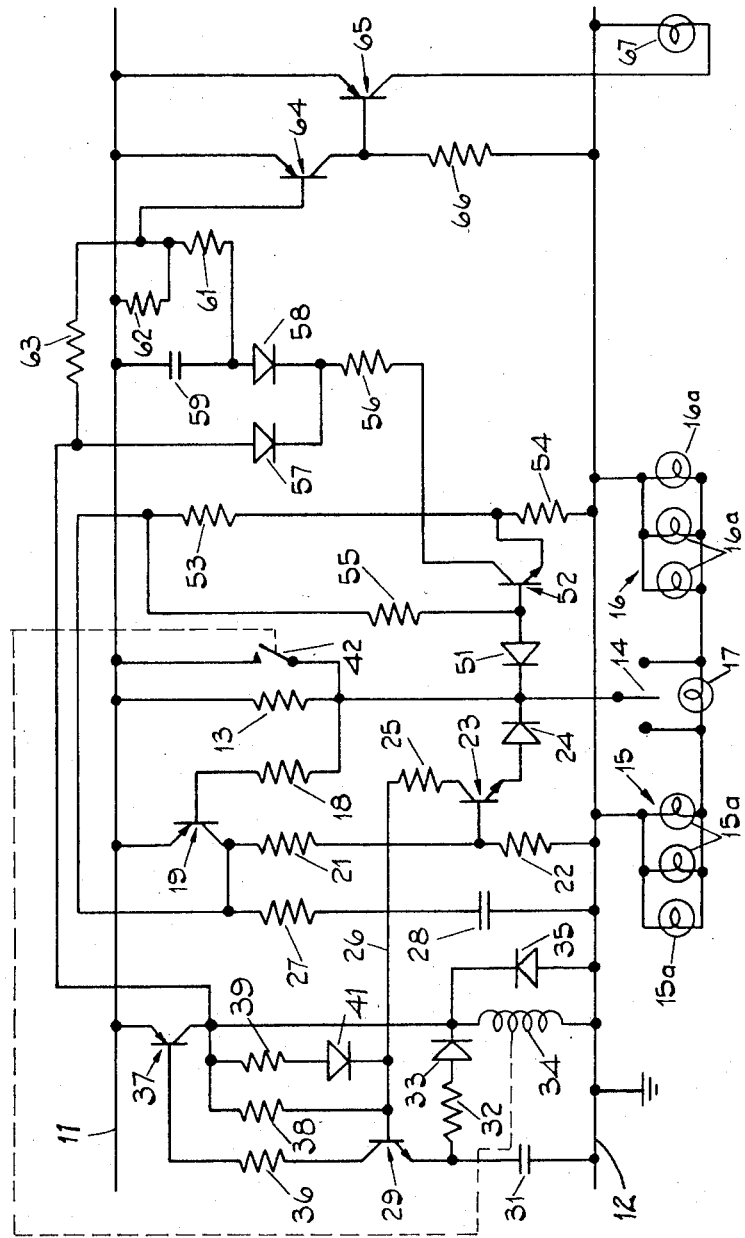

DIRECTION INDICATOR SYSTEMS FOR TRACTOR-TRAILER VEHICLES

This invention relates to direction indicator systems for tractor-trailer vehicles.

A system according to the invention comprises at least two left-hand and at least two right-hand direction indicator lamp terminals for connection in use to lamps on the tractor vehicle, at least one left-hand direction indicator lamp terminal and at least one right-hand direction indicator lamp terminal for connection to lamps on the trailer vehicle, the left-hand and right-hand direction indicator lamps on the trailer vehicle being connected in use in parallel with the left-hand and right-hand direction indicator lamps on the tractor vehicle respectively, a direction indicator switch for selecting either the left-hand or the right-hand direction indicator lamps, a first pilot lamp connected between the circuit to the left-hand and right-hand direction indicator lamp terminals so that when in use the direction indicator lamps on one side of the vehicle are selected, the first pilot lamp is energised by way of the direction indicator lamps on the other side of the vehicle and flashes in synchronism with the selected direction indicator lamps, an oscillator controlling the supply of power by way of the direction indicator switch to the selected direction indicator lamps, so that the selected direction indicator lamps flash in use at a frequency determined by the oscillator, means operable in use when at least two of the selected direction indicator lamps fail for altering the frequency of said oscillator so that the first pilot lamp flashes at a different frequency, a second pilot lamp, switching means controlled by said oscillator for causing said second pilot lamp to flash in synchronism with the first pilot lamp, and means operable in use when one of the selected direction indicator lamps fails for preventing flashing of said second pilot lamp.

Preferably, the oscillator controls a relay winding, the relay winding controlling a contact in series with the direction indicator switch.

Preferably, a resistor is connected across said contact and the potential at the junction of said resistor and the direction indicator switch when the direction indicator switch is closed and the relay contact is open is used to control the frequency of said oscillator.

Preferably, the potential at said junction is used to turn on a transistor which determines the frequency of the oscillator, but if in use at least two of the direction indicator lamps have failed, the transistor is not turned on, and the frequency of the oscillator is increased.

Preferably, if in use one of the selected direction indicator lamps has failed, then the potential at said junction is used to charge a capacitor, the potential across said capacitor serving when the relay contact closes to hold off the second pilot lamp.

The accompanying drawing is a circuit diagram illustrating one example of the invention.

Referring to the drawing, there are provided on the tractor vehicle positive and negative supply lines 11, 12 which are connected to the vehicle battery, the line 12 being earthed. The line 11 is connected through a resistor 13 to the movable contact of a direction indicator switch 14 which has an inoperative position shown, and a pair of operative positions in which it completes a circuit to either three left-hand direction indicator lamp terminals, or to three right-hand direction indicator lamp terminals 16a. The terminals 15a are connected to the line 12 in use through three lamps 15 in parallel, and the terminals 16a are connected in use to the line 12 through three lamps 16 in parallel. Two of the lamps 15 and two of the lamps 16 are on the tractor vehicle, and the other lamp 15 and lamp 16 are on a trailer vehicle. The circuits to the lamps 15 and 16 are bridged by a first pilot lamp 17, and if the lamps 15 are selected, then the pilot lamp 17 is energised by way of the lamp 16 and flashes in synchronism with the lamps 15. The current flowing through the lamp 17 is not of course sufficient to energise the lamp 16. With the lamp 16 selected, then of course the lamp 17 is energised through the lamps 15.

The junction of the resistor 13 and the switch 14 is connected through a resistor 18 to the base of a p-n-p transistor 19 having its emitter connected to the line 11 and its collector connected through resistors 21, 22 in series to the line 12. The junction of the resistors 21, 22 is connected to the base of an n-p-n transistor 23, the emitter of which is connected through a diode 24 to the switch 14 and the collector of which is connected through a resistor 25 to a line 26. The line 26 is connected through a resistor 27 to the collector of the transistor 19, and through a smoothing capacitor 18 to the line 12.

The circuit further includes an n-p-n transistor 29, the base of which is connected to the line 26 and the emitter of which is connected through a capacitor 31 to the line 12. The capacitor 31 is bridged by a resistor 32, a diode 33 and a relay winding 34 in series, and the winding 34 is bridged by a free wheel diode 35. The junction of the diode 33 and winding 34 is connected to the collector of a p-n-p transistor 37, the emitter of which is connected to the line 11 and the base of which is connected through a resistor 36 to the collector of the transistor 29. The collector of the transistor 37 is further connected to the line 26 through parallel paths one of which contains a resistor 38 and the other of which contains a resistor 39 in series with a diode 41. The winding 34 serves when energised to close a normally open relay contact 42 which bridges the resistor 13.

The junction of the resistor 13 and the switch 14 is further connected through a diode 51 to the base of an n-p-n transistor 52, the emitter of which is connected to the junction of a pair of resistors 53, 54 connected in series between the collector of the transistor 19 and the line 12. The base of the transistor 52 is connected through a resistor 55 to the collector of the transistor 19, and the collector of the transistor 52 is connected through a resistor 56 to the cathodes of a pair of diodes 57 and 58. The diode 57 has its anode connected to the collector of the transistor 37, and the diode 58 has its anode connected to the line 11 through parallel paths one of which contains a capacitor 59 and the other of which contains a pair of resistors 61 and 62 in series. The junction of the resistors 61 and 62 is connected through a resistor 63 to the collector of the transistor 37, and is also connected to the base of a p-n-p transistor 64 having its emitter connected to the line 11. The collector of the transistor 64 is connected to the base of a p-n-p transistor 65 having its base connected to the line 12 through a resistor 66, its emitter connected to the line 11, and its collector connected to the line 12 through a second pilot lamp 67.

In order to understand the operation of the circuit, it will be assumed that all the direction indicator lamps are operating satisfactorily. With the direction indicator switch 14 open, the transistor 64 is on but no current flows in any other part of the circuit, and the winding 34 is de-energised so that the contact 42 is open. When the switch 14 is moved to an operative position to select the lamps 15, for example, then current can flow through the emitter-base of the transistor 19 by way of the resistor 18 and the switch 14 so that the transistor 19 turns on, and the transistor 23 also turns on. It will be assumed for the moment that the transistor 52 is not conducting at this stage.

Conduction of the transistor 19 provides base current to the transistor 29, which turns on to turn on the transistor 37, so that the winding 34 is energised and the contact 42 closes. As soon as the contact 42 closes, the transistors 19 and 23 turn off, and current is now provided to the lamps 15 by way of the contact 42 and the switch 14. It will of course be appreciated that this action occurs substantially simultaneously, so that as soon as the switch 14 is closed, the lamps 15 are energised, and the lamp 17 is energised at the same time. Moreover, current flows through the resistor 66 to turn on the transistor 65, so that the lamp 67 is also illuminated. It will be appreciated that the transistor 64 is off at this stage, because its base is connected through the resistor 63 to the collector of the transistor 37, which is conducting so that the base and emitter of the transistor 64 are at substantially the same potential.

When the transistor 29 and the transistor 37 conduct the capacitor 31 starts to charge, and when the capacitor 31 has charged the transistor 29 turns off, so that the transistor 37 turns off and the winding 34 is de-energised so that the contact 42 opens. As soon as the contact 42 opens, then the lamps 15 and the lamp 17 are extinguished. Moreover, since the transistor 37 is now off, the transistor 64 is turned on by current flow through the resistor 63 and the resistors 53 and 54, so that the transistor 65 is turned off and the lamp 67 is extinguished.

When the transistors 19 and 37 turn off and the contact 42 opens, the transistor 19 is turned on again. Since all the lamps 15 are operating satisfactorily, the transistor 23 is turned on by current flow through the transistor 19, the resistor 21, the diode 24, the switch 14 and the lamps 15. Moreover, current can flow from the line 12 through the transistor 19, the resistor 55 and the diode 51, and then by way of the switch 14 and the lamps 15 to the line 12. The arrangement is such that the transistor 52 is not turned on when all the lamps 15 are operating.

As soon as the transistors 29 and 37 turn off, capacitor 31 starts to discharge by way of the resistor 32, the diode 33 and the winding 34, and continues to discharge until the emitter potential of the transistor 29 is slightly less than the potential of the line 26. The potential of the line 26 is determined primarily by the resistor 25, and when the capacitor 31 has discharged to the potential of the line 26, then the transistor 29 turns on again, the transistor 37 turns on, the winding 34 is energised, the contact 42 closes, the transistors 19 and 23 turn off and the lamps 15 are illuminated again. At the same time, the lamp 17 is illuminate and the transistor 64 is turned off because the transistor 37 is on, so that current flowing through the resistor 66 turns on the transistor 65 and the lamp 67 is illuminated again.

The cycle is now repeated. It will be seen that the transistors 19, 23, 29, 37, the capacitor 31, and the components associated with these transistors and capacitor, constitute an oscillator which operates at a predetermined frequency, the direction indicator lamps being operated at the frequency of the oscillator.

In the event that one of the lamps 15 fails, then the circuit parameters are so selected that the transistor 23 still conducts, so that the frequency of the oscillator is not altered. However, if one of the lamps 15 has failed, then at the instant when the contact 42 opens, current flows from the line 12 through the transistor 19 and the resistor 55 to turn on the transistor 52. Conduction of the transistor 52 charges the capacitor 59 by way of the diode 58. As soon as the other two lamps 15 cool down, their resistance decreases, and so after a short period of time the transistor 52 turns off again.

While the contact 42 is open, the lamp 67 is held off as previously described. However, when the contact 42 closes again the potential across the capacitor 59 now holds the transistor 64 on, so that the transistor 65 is off and the lamp 67 is not illuminated. Thus, failure of one of the lamps 15 is indicated by the fact that the lamp 67 remains extinguished, whilst the lamp 17 continues to flash at the same frequency as before.

In the event that two of the lamps 15 have failed, then while the contact 42 is open, the transistor 52 conducts for a short period as before to charge the capacitor 59 so that the lamp 67 is held off. However, with two lamps 15 failed, there is insufficient current flowing through the base-emitter path of the transistor 23 to turn the transistor 23 on, and so the transistor 23 remains off. In these circumstances, the potential of the line 26 is determined by the resistors 27, 21 and 22, and is substantially higher than when the transistor 23 conducts. The time taken for the capacitor 31 to discharge to the potential of the line 26 is now substantially reduced as compared to the situation when the transistor 23 conducts, and so the frequency of the oscillator is substantially increased. Thus, failure of two of the lamps 15 is indicated by the fact that the lamp 67 is extinguished, and the lamp 17 is flashing at a substantially increased rate.

When the contact 42 closes, the transistor 52 turns on momentarily. However, the capacitor 59 is not charged at this stage, because the connection by way of the diode 57 to the collector of the transistor 37 reverse biases the diode 58. There is a similar unwanted turn-on of the transistor 52 as the contact 42 opens, but the time for which the transistor 52 is open in these circumstances is extremely small, and the resistor 56 prevents the capacitor 59 from being charged sufficiently in the circumstances to hold off the lamp 67.

When the direction indicator switch 14 is first closed, the transistor 52 will not be turned on event if one of the lamps 15 has failed, because the lamps will be cold and so will have a very low resistance. Thus, even with one of the lamps 15 failed, the lamp 67 will flash once. This arrangement has the advantage that the lamp 67 is always tested.

I claim:

1. A direction indicator system for a tractor-trailer vehicle, comprising at least two left-hand and at least two right-hand direction indicator lamps on the tractor vehicle, at least one left-hand direction indicator lamp and at least one right-hand direction indicator lamp on the trailer vehicle, the left-hand and right-hand direction indicator lamps on the trailer vehicle being connected in parallel with the left-hand and right-hand direction indicator lamps on the tractor vehicle respectively, a direction indicator switch for completing a circuit to either the left-hand or the right-hand direction indicator lamps, a first pilot lamp connected between the circuit to the left-hand and right-hand direction indicator lamps so that when the direction indicator lamps on one side of the vehicle are selected, the first pilot lamp is energised by way of the direction indicator lamps on the other side of the vehicle and flashes in synchronism with the selected direction indicator lamps, an oscillator controlling the supply of power by way of the direction indicator switch to the selected direction indicator lamps, so that the selected direction indicator lamps flash at a frequency determined by the oscillator, means operable when at least two of the direction indicator lamps selected by the direction indicator switch fail for altering the frequency of said oscillator so that the first pilot lamp flashes at a different frequency, a second pilot lamp, switching means controlled by said oscillator for causing said second pilot lamp to flash in synchronism with the first pilot lamp, and means operable when one of the direction indicator lamps selected by the direction indicator lamps fails for preventing flashing of said second pilot lamp.

2. A system as claimed in claim 1 in which the oscillator controls a relay winding, the relay winding controlling a contact in series with the direction indicator switch.

3. A system as claimed in claim 2 in which a resistor is connected across said contact and the potential at the junction of said resistor and the direction indicator switch when the direction indicator switch is closed and the relay contact is open is used to control the frequency of said oscillator.

4. A system as claimed in claim 3 in which the potential at said junction is used to turn on a transistor which determines the frequency of the oscillator, but if at least two of the direction indicator lamps selected by the direction indicator lamps have failed, the transistor is not turned on, and the frequency of the oscillator is increased.

5. A system as claimed in claim 3 in which said means operable when one of the direction indicator lamps selected by the direction indicator switch fails for preventing flashing of said second pilot lamp comprises a capacitor which is charged by the potential at said junction, the potential across said capacitor serving when the relay contact closes to hold off the second pilot lamp if one of the direction indicator lamps selected by the direction indicator switch has failed.

* * * * *